United States Patent [19]

Abrams

[11] 4,104,598
[45] Aug. 1, 1978

[54] LASER INTERNAL COUPLING MODULATION ARRANGEMENT WITH WIRE GRID POLARIZER SERVING AS A REFLECTOR AND COUPLER

[75] Inventor: Richard L. Abrams, Pacific Palisades, Calif.

[73] Assignee: Hughes Aircraft Company, Culver City, Calif.

[21] Appl. No.: 584,788

[22] Filed: Jun. 9, 1975

[51] Int. Cl.² ............................................. H01S 3/10
[52] U.S. Cl. .......................... 331/94.5 M; 331/94.5 C
[58] Field of Search .................... 331/94.5 C, 94.5 M; 330/4.3

[56] References Cited

U.S. PATENT DOCUMENTS 3,471,802   10/1969   Caulfield ........................ 331/94.5 M

OTHER PUBLICATIONS

Ulrich et al., Applied Optics, vol. 9, No. 11, Nov. 1970, pp. 2511–2516.

Primary Examiner—William L. Sikes
Assistant Examiner—Marcus S. Rasco
Attorney, Agent, or Firm—Paul M. Coble; W. H. MacAllister

[57] ABSTRACT

A laser internal coupling modulation arrangement is disclosed wherein a wire grid polarizer serves as one of the reflectors forming part of the laser optical cavity, as a polarization selector which constrains the laser oscillation to a desired linear polarization, and as an output coupler which couples an orthogonal linearly polarized beam out of the laser optical cavity in response to an amplitude varying modulating signal applied to an electrooptic modulator disposed within the laser optical cavity.

4 Claims, 1 Drawing Figure

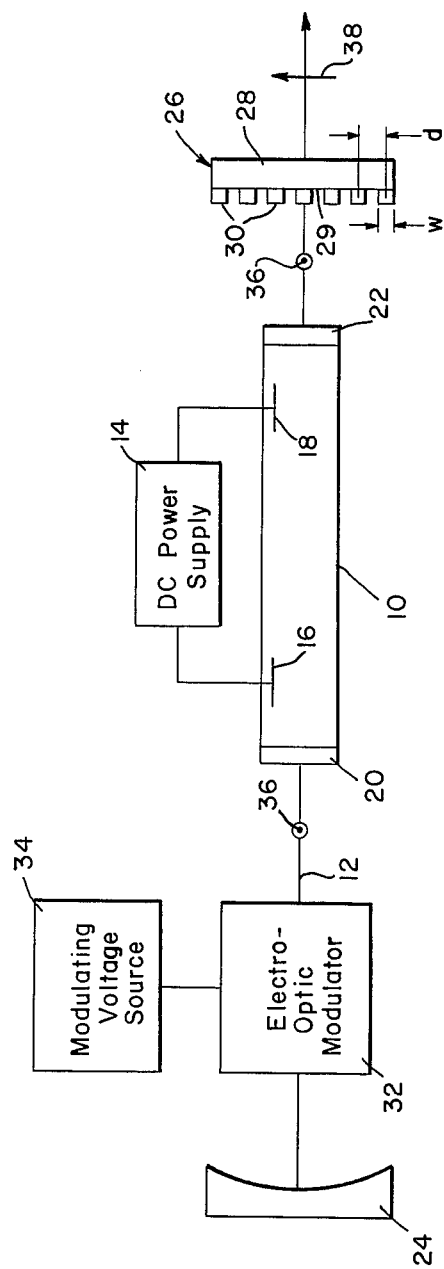

LASER INTERNAL COUPLING MODULATION ARRANGEMENT WITH WIRE GRID POLARIZER SERVING AS A REFLECTOR AND COUPLER

This invention relates to lasers, and more particularly relates to a highly efficient internal coupling modulation arrangement for obtaining a linearly polarized output from a laser in accordance with a modulating signal.

Electrooptic laser modulators are well known and have been employed in numerous laser applications. By locating such a modulator within the laser optical cavity a significant reduction in driving power may be realized compared to that required when the same modulator is situated external to the laser cavity. This is due primarily to the fact that the modulator operates on the higher optical power available within the laser cavity.

One useful form of internal laser modulation is coupling modulation. In this type of modulation arrangement an electrooptic modulator and a polarization sensitive output coupler are disposed within a laser optical cavity in which the laser energy regeneratively traversing the laser medium is constrained to be linearly polarized. In the past a Brewster angle window for the laser has served as both the polarizing element and the output coupler. By applying a voltage to the electrooptic modulator, an orthogonally polarized component of the regenerative laser energy is produced which is coupled out of the laser cavity via the output coupler. The magnitude of this orthogonally polarized component varies in accordance with the magnitude of the voltage applied to the modulator, thereby providing an amplitude modulated laser output beam. For further details concerning previous laser internal coupling modulation arrangements, reference may be made to an article by J. E. Kiefer, T. A. Nussmeier and F. E. Goodwin, "Intracavity CdTe Modulators for $CO_2$ Lasers", IEEE Journal of Quantum Electronics, Vol. QE-8 (Feb. 1972), pages 173-179.

A problem with the aforedescribed laser internal coupling modulation arrangements is that the characteristics of the Fresnel reflections occurring at the surfaces of the Brewster angle window which serves as the output coupler limit the coupling efficiency to around 40-50%. In addition, the output beam is obtained along a direction non-coincident with the laser axis. Such a beam exit direction is inconvenient for many system applications.

Accordingly, it is an object of the present invention to provide a laser internal coupling modulation arrangement which achieves nearly 100% output coupling efficiency.

It is a further object of the invention to provide a laser internal coupling modulation arrangement in which the output beam is obtained along a direction coincident with the laser axis.

In an arrangement according to the invention a laser medium is excited to a condition of stimulated emission whereby laser radiation is emitted along a predetermined axis through the laser medium. A reflective element and a wire grid polarizer are spaced from opposite ends of the laser medium along the axis to constitute a laser optical cavity. A modulator, to which a desired modulating signal is applied, is disposed along the axis within the optical cavity.

The modulating signal varies between a first level enabling the emitted laser radiation to regeneratively traverse the laser medium linearly polarized in a predetermined plane as determined by the wire grid polarizer, and at least one different level causing the modulator to produce a component of the laser radiation linearly polarized in an orthogonal plane, whereby such orthogonal component is coupled out of the laser optical cavity along the axis via the wire grid polarizer.

Additional objects, advantages and characteristic features of the present invention will become readily apparent from the following detailed description of a preferred embodiment of the invention when considered in conjunction with the accompanying drawing wherein the sole FIGURE schematically illustrates a laser internal coupling modulation arrangement according to the invention.

Referring to the FIGURE with greater particularity, there is shown a laser tube 10 containing a polarization insensitive laser medium which, when excited, emits laser radiation at a predetermined wavelength along laser tube axis 12. As a specific example, the laser medium may be $CO_2$ providing an output at 10.6 $\mu m$, although it should be understood that other laser materials (including solids and liquids) and other output wavelengths are also suitable. A dc power supply 14 is coupled between laser tube electrodes 16 and 18 to supply an operating potential which establishes a discharge within tube 10 sufficient to excite the laser medium to a condition of stimulated emission. It is pointed out that, depending upon the laser medium, other forms of excitation (such as optical excitation) also may be employed. The ends of the laser tube 10 are provided with respective windows 20 and 22 of a material transparent to the emitted laser radiation and oriented perpendicular to laser tube axis 12. For laser radiation at 10.6 $\mu m$ the windows 20 and 22 may be of CdTe, coated with a suitable antireflection coating such as a layer of ZnSe over a layer of $ThF_4$.

In order to regeneratively reflect generated laser radiation back and forth through the laser tube 10 along axis 12, a laser optical cavity is provided consisting of a totally reflecting mirror 24 spaced from one end of the laser tube 10 along axis 12 and a wire grid polarizer 26 spaced from the other end of the tube 10 along the axis 12. A wire grid polarizer consists of a substrate of a material transparent to electromagnetic waves of a desired wavelength and provided with a plurality of parallel electrically conductive strips on its broad surface positioned to receive the electromagnetic waves. Substantially all of the electromagnetic radiation incident on the wire grid polarizer with its electric field vector parallel to the conductive strips is reflected, while substantially all of the incident electromagnetic radiation having its electric field vector perpendicular to the strips is transmitted through the wire grid polarizer. Further details concerning wire grid polarizers may be found in an article by P. K. Cheo and C. D. Bass, "Efficient Wire-Grid Duplexer Polarizer for $CO_2$ Lasers", *Applied Physics Letters*, Vol. 18 (June 15, 1971), pages 565-567.

In the embodiment of the invention illustrated in the FIGURE, wire grid polarizer 26 consists of a slab 28 of a material transparent to radiation from the laser tube 10 and having a planar surface 29 disposed perpendicular to the axis 12 and facing the laser tube 10. Slab surface 29 is provided with a plurality of parallel electrically conductive strips 30 of width $w$ and center-to-center spacing $d$. For a $CO_2$ laser providing an output at 10.6 $\mu m$ the slab 28 may be of anti-reflection coated CdTe and the wire strips 30 of gold. In order to insure against diffraction of incident laser radiation off of the wire grid polarizer 26 along a direction non-coincident with axis 12, the strip spacing $d$ must be less than the wavelength $\lambda$ of the incident radiation. Preferably, half the strip spacing, i.e. $d/2$, and also the strip width $w$ (for convenience during fabrication) are made equal to about $\lambda/10$ for the desired wavelength. Thus, half the strip spacing, i.e. $d/2$, and the width $w$ would each be around 1 $\mu$m for laser radiation at 10.6 $\mu$m. Details concerning the fabrication of the aforedescribed wire grid polarizer may be found in an article by Hugh L. Garvin, "High Resolution Fabrication by Ion Beam Sputtering", *Solid State Technology*, Nov. 1973, pages 31-36.

In order to produce coupling modulation of the laser radiation emitted from the tube 10, a modulator 32 is disposed within the laser optical cavity provided by mirror 24 and wire grid polarizer 26. Although the modulator 32 is shown as disposed between laser tube 10 and mirror 24, alternatively the modulator 32 could be located between the laser tube 10 and the wire grid polarizer 26. The modulator 32 is preferably a crystal of electrooptic material provided with suitable electrodes and oriented with its electrooptic axes at an angle of 45° with respect to the length of the conductive strips 30. As a specific illustrative example, the modulator 32 may be a CdTe modulator as described in the aforementioned article by J. E. Kiefer, T. A. Nussmeier and F. E. Goodwin. Such electrooptic modulators are conventional and generally widely known in the art. An exemplary publication which describes the theory and design of such modulators in depth is "The Modulation of Laser Light," by Donald F. Nelson, *Readings from Scientific American*, W. H. Freeman and Company, June 1968, pages 332-338. It may be seen from the Nelson publication that an appropriate electrooptic modulator functions to change the plane of polarization of light traversing the modulator by an angle dependent upon the magnitude of the voltage applied to the modulator. An amplitude varying modulating voltage from a modulating voltage source 34 is applied to the electrooptic modulator 32 to achieve coupling modulation of the generated laser beam in accordance with the amplitude of the modulating voltage.

In the operation of the laser coupling modulation arrangement shown in the FIGURE, activation of the dc power supply 14 excites the medium in laser tube 10 to a condition of stimulated emission, producing laser radiation along axis 12. Since wire grid polarizer 26 reflects only incident radiation having its electric field vector parallel to the strips 30 (i.e. perpendicular to the plane of the FIGURE), regeneration of the generated laser energy occurs only for laser radiation polarized perpendicular to the plane of the FIGURE. Hence, laser oscillation builds up polarized perpendicular to the plane of the FIGURE, as shown by arrowheads 36.

Application of a modulating voltage to the electrooptic modulator 32 causes a component of the laser radiation traversing the modulator 32 to become polarized in an orthogonal direction, i.e. parallel to the plane of the FIGURE. Since this radiation component is polarized perpendicular to the strips 30, it passes through the wire grid polarizer 26 unattenuated, providing output laser radiation which is linearly polarized in the plane of the FIGURE, as shown by arrow 38. Since the magnitude of the orthogonally polarized component 38 produced by modulator 32 is determined by the amplitude of the modulating voltage, the laser output beam is amplitude modulated in accordance with the modulating voltage.

It will be apparent that in an arrangement according to the invention the wire grid polarizer 26 performs three different functions. First, it serves as one of the reflectors forming part of the laser optical cavity. Second, it serves as a polarization selector which constrains the laser oscillation to a desired linear polarization. Third, it functions as an energy coupler which couples the desired output beam out of the laser optical cavity. Moreover, since the wire grid polarizer 26 acts as a nearly totally reflecting mirror for radiation polarized parallel to the strips 30 and as a nearly totally transmitting window for radiation polarized perpendicular to the strips 30, an arrangement according to the invention achieves nearly 100% output coupling efficiency. In addition, the laser output beam is obtained along the highly convenient direction coincident with the laser axis 12.

Although the invention has been shown and described with respect to a particular embodiment, nevertheless various changes and modifications obvious to a person skilled in the art to which the invention pertains are deemed to lie within the spirit, scope and contemplation of the invention.

What is claimed is:

1. A laser modulation arrangement comprising:
    a laser medium disposed along a predetermined axis;
    means for exciting said laser medium to a condition of population inversion;
    a reflective element spaced from one end of said laser medium along said axis and a wire grid polarizer spaced from the other end of said laser medium along said axis in such manner as to constitute a laser optical cavity for stimulating the emission of laser radiation from said medium along said axis;
    an electrooptic modulator disposed along said axis within said laser optical cavity and responsive to an applied voltage to change the plane of polarization of said laser radiation traversing said modulator by an angle dependent upon the magnitude of said applied voltage; and
    means for applying a modulating voltage to said modulator.

2. A laser modulation arrangement comprising:
    a laser medium disposed along a predetermined axis;
    means for exciting said laser medium to a condition of population inversion;
    a reflective element spaced from one end of said laser medium along said axis and a wire grid polarizer spaced from the other end of said laser medium along said axis in such manner as to constitute a laser optical cavity for stimulating the emission of laser radiation from said medium along said axis;
    an electrooptic modulator disposed along said axis within said laser optical cavity and responsive to an applied voltage to change the plane of polarization of said laser radiation traversing said modulator by an angle depending upon the magnitude of said voltage; and
    means for applying to said modulator a modulating voltage which varies between a first level enabling said laser radiation to regeneratively traverse said laser medium linearly polarized in a predetermined plane as determined by said wire grid polarizer, and at least one different level causing said modulator to produce a component of said laser radiation linearly polarized in a plane orthogonal to said predetermined plane, whereby said component is coupled out of said laser optical cavity along said axis via said wire grid polarizer.

3. A laser modulation arrangement comprising:

a laser medium disposed along a predetermined axis;

means for exciting said laser medium to a condition of population inversion;

a reflective element spaced from one end of said laser medium along said axis and having a surface substantially totally reflective of radiation at a predetermined wavelength facing said laser medium;

a slab of material transparent to radiation at said predetermined wavelength spaced from the other end of said laser medium along said axis and having a planar surface disposed perpendicular to said axis and facing said laser medium, a plurality of parallel electrically conductive strips disposed on said planar surface with a center-to-center spacing less than said predetermined wavelength, said slab and said reflective element constituting an optical resonator for stimulating the emission of laser radiation at said predetermined wavelength from said medium along said axis;

an electrooptic modulator disposed along said axis between said laser medium and one of the elements selected from the group consisting of said slab and said reflective element and responsive to an applied voltage to change the plane of polarization of said laser radiation traversing said modulator by an angle dependent upon the magnitude of said applied voltage; and means for applying a modulating voltage to said modulator.

4. A laser modulation arrangement comprising:

a laser medium disposed along a predetermined axis;

means for exciting said laser medium to a condition of population inversion;

a reflective element spaced from one end of said laser medium along said axis and having a surface substantially totally reflective of radiation at a predetermined wavelength facing said laser medium;

a slab of a material transparent to radiation at said predetermined wavelength spaced from the other end of said laser medium along said axis and having a planar surface disposed perpendicular to said axis and facing said laser medium, a plurality of parallel electrically conductive strips disposed on said planar surface with a center-to-center spacing less than said predetermined wavelength, said slab and said reflective element constituting an optical resonator for stimulating the emission of laser radiation at said predetermined wavelength from said medium along said axis;

an electrooptic modulator disposed along said axis between said laser medium and one of the elements selected from the group consisting of said slab and said reflective element and responsive to an applied voltage to change the plane of polarization of said laser radiation traversing said modulator by an angle dependent upon the magnitude of said applied voltage; and means for applying to said modulator a modulating voltage which varies between a first level enabling said laser radiation to regeneratively traverse said laser medium linearly polarized in a predetermined plane parallel to said strips, and at least one different level causing said modulator to produce a component of said laser radiation linearly polarized in a plane orthogonal to said predetermined plane, whereby said component is coupled out of said arrangement along said axis via said slab.

* * * * *